(12) United States Patent
Utsunomiya et al.

(10) Patent No.: US 11,480,464 B2
(45) Date of Patent: Oct. 25, 2022

(54) OPTICAL SENSOR

(71) Applicant: ABLIC Inc., Tokyo (JP)

(72) Inventors: Fumiyasu Utsunomiya, Tokyo (JP);
Takakuni Douseki, Kusatsu (JP); Ami Tanaka, Kusatsu (JP)

(73) Assignee: ABLIC INC., Tokyo (JP)

( * ) Notice: Subject to any disclaimer, the term of this patent is extended or adjusted under 35 U.S.C. 154(b) by 246 days.

(21) Appl. No.: 17/082,265

(22) Filed: Oct. 28, 2020

(65) Prior Publication Data

US 2021/0123803 A1 Apr. 29, 2021

(30) Foreign Application Priority Data

Oct. 28, 2019 (JP) .............................. JP2019-195139

(51) Int. Cl.
*G01J 1/44* (2006.01)
(52) U.S. Cl.
CPC ........... *G01J 1/44* (2013.01); *G01J 2001/446* (2013.01); *G01J 2001/448* (2013.01)
(58) Field of Classification Search
CPC ... G01J 1/44; G01J 2001/446; G01J 2001/448
See application file for complete search history.

(56) References Cited

U.S. PATENT DOCUMENTS

2010/0207451 A1* 8/2010 Liu ........................ G05F 1/67
307/43
2013/0256513 A1 10/2013 Kitade

FOREIGN PATENT DOCUMENTS

JP 2013-197243 A 9/2013

* cited by examiner

*Primary Examiner* — Thanh Luu
(74) *Attorney, Agent, or Firm* — Crowell & Moring LLP

(57) ABSTRACT

Provided is an optical sensor including: a first photodetector including a first photodiode and having a first wavelength sensitivity characteristic; a first resistor having one end connected to a cathode of the first photodiode, and another end connected to a ground point; a second photodetector including a second photodiode and having a second wavelength sensitivity characteristic; a second resistor having one end connected to a cathode of the second photodiode, and another end connected to the ground point; and an amplifier circuit having a first input terminal connected to the first photodiode, a second input terminal connected to the second photodiode, and an output terminal configured to output a potential based on a potential of the first input terminal and a potential of the second input terminal, and using, as an operating power supply, electric power generated by electromotive force of the first photodetector and the second photodetector.

6 Claims, 10 Drawing Sheets

OPTICAL SENSOR

RELATED APPLICATIONS

This application claims priority to Japanese Patent Application No. 2019-195139, filed on Oct. 28, 2019, the entire content of which is incorporated herein by reference.

BACKGROUND OF THE INVENTION

1. Field of the Invention

The present invention relates to an optical sensor.

2. Description of the Related Art

Hitherto, there is known a technology relating to an optical sensor configured to output, from an output circuit, a signal corresponding to light received by a photodiode (see Japanese Patent Application Laid-open No. 2013-197243, for example).

In such a conventional optical sensor as described above, power for driving the output circuit is supplied from outside the optical sensor.

SUMMARY OF THE INVENTION

It is an object of the present invention to provide an optical sensor configured to drive without an external power supply, i.e., a self-drivable optical sensor.

An optical sensor according to at least one aspect of the present invention includes: a first photodetector which includes a first photodiode and has a first wavelength sensitivity characteristic; a first resistor having a first end connected to a cathode of the first photodiode, and a second end connected to a ground point; a second photodetector which includes a second photodiode having an anode connected to an anode of the first photodiode, and has a second wavelength sensitivity characteristic being different from the first wavelength sensitivity characteristic; a second resistor having a first end connected to a cathode of the second photodiode, and a second end connected to the ground point; and an amplifier circuit having a first input terminal connected to the cathode of the first photodiode, a second input terminal connected to the cathode of the second photodiode, and an output terminal configured to output a potential based on a difference between a potential of the first input terminal and a potential of the second input terminal, the amplifier circuit being configured to use, as an operating power supply, electric power generated by electromotive force of the first photodiode and the second photodiode.

According to at least one embodiment of the present invention, it is possible to provide an optical sensor configured to drive an external power supply, i.e., a self-drivable optical sensor.

DETAILED DESCRIPTION OF THE PREFERRED EMBODIMENTS

Now, embodiments of the present invention are described with reference to the drawings.

First Embodiment

Figure 1:
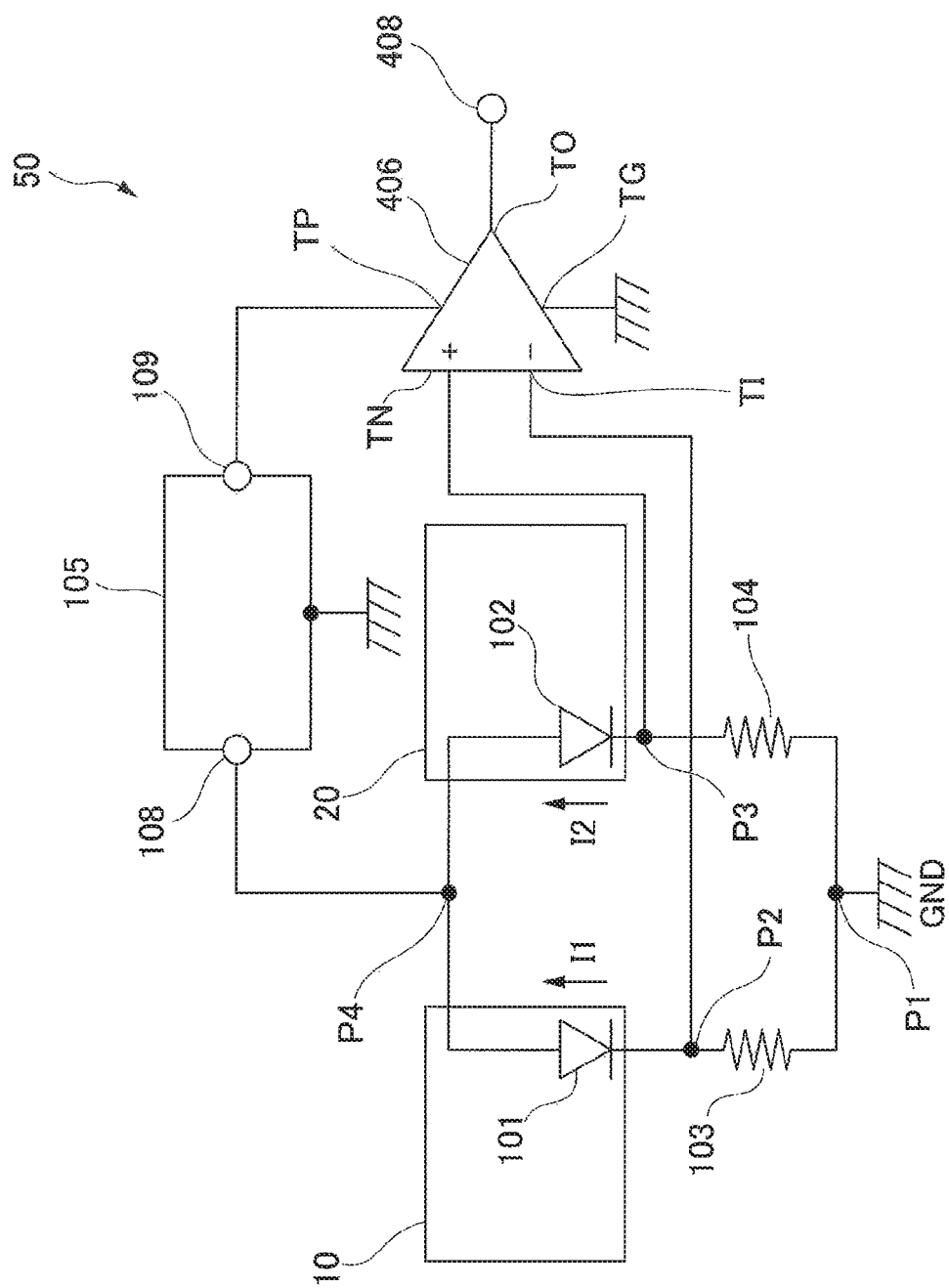
FIG. 1 is a diagram for illustrating an example of a configuration of an optical sensor according to a first embodiment of the present invention.

FIG. 1 is a diagram for illustrating an example of a configuration of an optical sensor according to the first embodiment. The optical sensor 50 is the example of the optical sensor according to the first embodiment, and includes a first photodetector 10, a second photodetector 20, a first resistor 103, a second resistor 104, a booster circuit 105, an amplifier circuit 406, and an output pin 408.

In the following description, the term "light" refers to an electromagnetic wave having a wavelength which is detectable by the optical sensor 50, and broadly encompasses, in addition to a visible ray, an infrared ray and an ultraviolet ray, for example.

The first photodetector 10 includes a first photodiode 101.

The second photodetector 20 includes a second photodiode 102.

An anode of the first photodiode 101 and an anode of the second photodiode 102 are connected to each other at a connection point P4. In other words, the second photodiode 102 contains the anode connected to the anode of the first photodiode 101.

In the first embodiment, each of the first photodetector 10 and the second photodetector 20 may include any element as long as the element generates electric power with incident light. As an example, each of the photodiodes included in the first photodetector 10 and the second photodetector 20 is an element in which a p-type semiconductor and an n-type semiconductor form a pn junction to generate a photocurrent by the photovoltaic effect. For example, each of the photodiodes is a pn junction element, such as a photovoltaic cell.

The first resistor 103 has one end connected to a cathode of the first photodiode 101 at a connection point P2, and another end grounded at a connection point P1.

The second resistor 104 has one end connected to a cathode of the second photodiode 102 at a connection point P3, and another end grounded at the connection point P1.

The first resistor 103 and the second resistor 104 have identical characteristics, such as resistance values and temperature characteristics. For example, each of the resistance value of the first resistor 103 and the resistance value of the second resistor 104 is 30 kiloohms (kΩ).

The booster circuit 105 has an input terminal 108 and an output terminal 109. The input terminal 108 is connected to the anode of the first photodiode 101 and the anode of the second photodiode 102 at the connection point P4. The booster circuit 105 is configured to boost a voltage supplied to the input terminal 108 and output the boosted voltage to the output terminal 109.

In the first embodiment, the booster circuit 105 is a charge-pump step-up DC-DC converter circuit including a clock generation circuit (not illustrated). In this example, the booster circuit 105 performs a boost operation without requiring an external power supply.

The amplifier circuit 406 has a power supply terminal TP, a power supply terminal TG, a first input terminal TI, a second input terminal TN, and an Output terminal TO. The power supply terminal TP is connected to the output terminal 109 of the booster circuit 105. The power supply terminal TG is grounded. The amplifier circuit 406 is configured to operate using, as a power supply, the electric power output from the booster circuit 105.

The first input terminal TI is connected to the cathode of the first photodiode 101 at the connection point P2. The second input terminal TN is connected to the cathode of the second photodiode 102 at the connection point P3. The output terminal TO is connected to the output pin 408, and is configured to output a potential based on a potential of the first input terminal and a potential of the second input terminal.

In this example, the amplifier circuit 406 is a differential amplifier circuit. The first input terminal TI is an inverted input terminal of the amplifier circuit 406. The second input terminal TN is a non-inverted input terminal of the amplifier circuit 406. The output terminal TO is configured to output a voltage or current based on a potential of the first input terminal TI and a potential of the second input terminal TN. As an example, the output terminal TO is configured to output a potential which is a difference between the potential of the first input terminal TI and the potential of the second input terminal TN.

(Operation Example of Optical Sensor 50)

Each of the first photodiode 101 and the second photodiode 102 is configured to generate electromotive force by the photovoltaic effect due to incident (entering) light. The first photodiode 101 is configured to generate a photocurrent I1 to flow from the cathode to the anode of the first photodiode 101 by the electromotive force. The second photodiode 102 is configured to generate a photocurrent I2 to flow from the cathode to the anode of the second photodiode 102 by the electromotive force.

The first photodetector 10 and the second photodetector 20 have different wavelength sensitivity characteristics. The "wavelength sensitivity characteristic" as used herein refers to a light receiving sensitivity of a photodetector for a wavelength of the entering light.

The first photodetector 10 has a first wavelength sensitivity characteristic. The first photodetector 10 is configured to output the photocurrent I1 corresponding to an intensity of the light entering the first photodiode 101 and to the first wavelength sensitivity characteristic. In other words, the first photodetector 10 includes the first photodiode 101, and has the first wavelength sensitivity characteristic.

The second photodetector 20 has the structure in which a structure or a filter configured to reduce a photovoltaic characteristic in a predetermined wavelength range is mounted to the first photodetector 10. In the following description, a wavelength range in which the second photodetector 20 has the reduced power generation amount is referred to as the "predetermined wavelength range".

In this example, the second photodetector 20 includes a wavelength filter (not illustrated). The second photodetector 20 is configured to detect light which is transmitted through the wavelength filter and enters the second photodiode 102. The wavelength filter has a wavelength characteristic in which a sensitivity to the predetermined wavelength range is reduced as compared to the first wavelength sensitivity characteristic described above. In other words, the second photodetector 20 includes the second photodiode 102, and has a second wavelength sensitivity characteristic which is different from the first wavelength sensitivity characteristic.

The second wavelength sensitivity characteristic has a reduced sensitivity to the predetermined wavelength range, of a wavelength range in which the first wavelength sensitivity characteristic has a sensitivity.

In the first embodiment, it has been described that the second photodetector 20 has the second wavelength sensitivity characteristic which is different from the first wavelength sensitivity characteristic by including the wavelength filter (not illustrated). However, the present invention is not limited to this embodiment as long as the second photodetector 20 has the second wavelength sensitivity characteristic which is different from the first wavelength sensitivity characteristic. For example, the following configuration may be adopted: the wavelength sensitivity characteristic of the second photodiode 102 included in the second photodetector 20 is different from the wavelength sensitivity characteristic of the first photodiode 101.

When light including the predetermined wavelength range enters the first photodetector 10 and the second photodetector 20, the second photodetector 20 has a reduced power generation amount in proportion to a light intensity in the predetermined wavelength range as compared to the first photodetector 10.

The first resistor 103 and the second resistor 104 have equal resistance values. Through the first resistor 103, the photocurrent I1 flows from the connection point P1. Through the second resistor 104, the photocurrent I2 flows from the connection point P1. Thus, in the first embodiment, a potential of the connection point P2 and a potential of the connection point P3 are reduced as compared to a potential of the connection point P1.

When the first photodetector 10 and the second photodetector 20 detect light in the predetermined wavelength range, the second photodetector 20 has the lower photovoltaic characteristic in the predetermined wavelength range, and hence the photocurrent I2 becomes smaller. As the photocurrent I2 becomes smaller, the potential of the connection point P3 increases, and thereby becomes higher than the potential of the connection point P2 in proportion to the light intensity in the predetermined wavelength range.

In this example, with the light entering the first photodetector 10 and the second photodetector 20, the electromotive force is generated in the first photodetector 10 and the second photodetector 20. When the generated electromotive force exceeds a predetermined value (e.g., 0.4 V), the photocurrent I1 flows through the first photodetector 10, and the photocurrent I2 flows through the second photodetector 20. The flowed photocurrent I1 or I2 flows into the booster circuit 105. To the input terminal 108 of the booster circuit 105, the photocurrent I1 flows from the first photodetector 10 via the connection point P4, and the photocurrent I2 flows from the second photodetector 20 via the connection point P4.

The booster circuit 105 is configured to convert electric power generated by the first photodetector 10 and the second photodetector 20 into boosted electric power having a higher voltage, and supply the boosted electric power to the amplifier circuit 406 via the output terminal 109.

In other words, the booster circuit 105 is configured to supply, to the power supply terminal of the amplifier circuit 406, the electric power obtained by boosting the electric power generated by the electromotive force of the first photodetector 10 and the second photodetector 20.

The amplifier circuit 406 is configured to use, as an operating power supply, the electric power generated by the electromotive force of the first photodiode 101 of the first photodetector 10 and the second photodiode 102 of the second photodetector 20.

The amplifier circuit 406 is configured to output, to the output pin 408 via the output terminal TO, a voltage or current based on a difference between the potential of the connection point P2 and the potential of the connection point P3.

In the optical sensor 50 according to the first embodiment, a voltage or current corresponding to the light intensity in the predetermined wavelength range is output from the output pin 408.

(Configuration Example of Amplifier Circuit 406)

Figure 2:
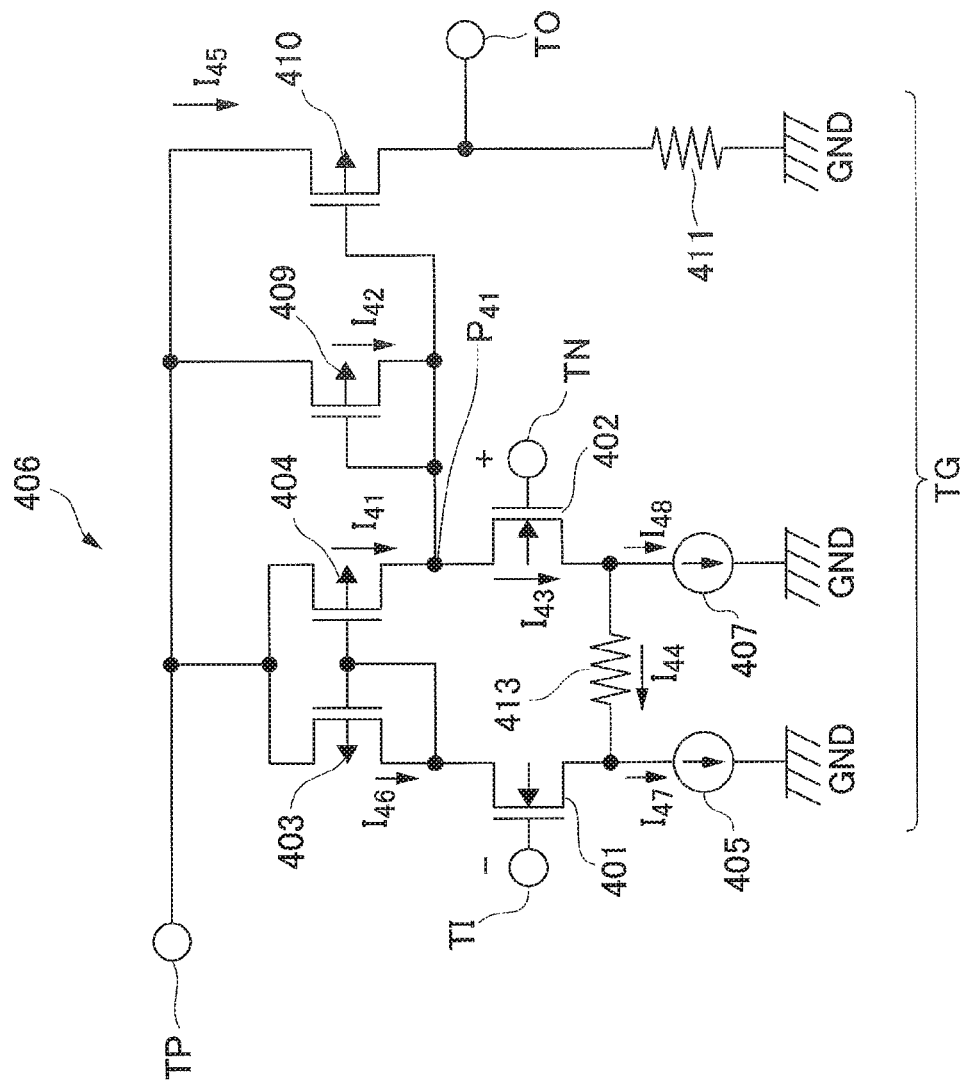
FIG. 2 is a diagram for illustrating an example of a configuration of an amplifier circuit in the first embodiment.

FIG. 2 is a diagram for illustrating an example of a configuration of the amplifier circuit 406 in the first embodiment.

The amplifier circuit 406 includes a transistor 403, a transistor 404, a transistor 409, a transistor 410, a transistor 401, a transistor 402, a resistor 413, a resistor 411, a constant current source 405, and a constant current source 407.

Each of the transistor 403, the transistor 404, the transistor 409, and the transistor 410 is a p-channel transistor. Each of the transistor 401 and the transistor 402 is a depletion type n-channel transistor. In the following description, a transistor not specified as a "depletion type" may be of an enhancement type.

The constant current source 405 and the constant current source 407 are configured to allow electric currents of the same current value to flow therethrough. An electric current which flows through the constant current source 405 is defined as an "electric current $I_{47}$", and an electric current which flows through the constant current source 407 is defined as an "electric current $I_{48}$". The electric current $I_{47}$ and the electric current $I_{48}$ have the same current value.

The depletion type n-channel transistor 401 has a gate connected to the first input terminal TI, a source connected to the power supply terminal TG via the constant current source 405, and a drain connected to a drain of the transistor 403. The depletion type n-channel transistor 402 has a gate connected to the second input terminal TN, a source connected to the power supply terminal TG via the constant current source 407, and a drain connected to a drain of the transistor 404. The source of the depletion type n-channel transistor 401 and the source of the depletion type n-channel transistor 402 are connected to each other via the resistor 413.

The transistor 403 has a source connected to the power supply terminal TP, a gate connected to the drain thereof and a gate of the transistor 404, and the drain connected to the drain of the depletion type n-channel transistor 401. The transistor 404 has a source connected to the power supply terminal TP, the gate connected to the gate of the transistor 403 and the drain of the transistor 403, and the drain connected to the drain of the depletion type n-channel transistor 402.

The transistor 409 has a gate and a drain connected to the drain of the transistor 404, and a source connected to the power supply terminal TP. The transistor 410 has a gate connected to the drain of the transistor 404, a source connected to the power supply terminal TP, and a drain connected to the output terminal TO, and to the power supply terminal TG via the resistor 411.

In this example, each of the transistor 401 and the transistor 402 is a depletion type n-channel transistor, and forms a differential pair of transistors. The differential pair of transistors 401 and 402 can support an input voltage which is lower than the power supply terminal TG.

Here, if the first photodetector 10 and the second photodetector 20 detect light in the predetermined wavelength range, the potential of the second input terminal TN becomes higher than the potential of the first input terminal TI in proportion to the light intensity in the predetermined wavelength range. A potential difference between the first input terminal TI and the second input terminal TN substantially translates into a potential difference applied to the resistor 413, and an electric current $I_{44}$ corresponding to the potential difference flows through the resistor 413.

An electric current which flows through the transistor 403 flows through the constant current source 405 via the drain and the source of the depletion type n-channel transistor 401. Thus, an electric current $I_{46}$ which flows through the source and the drain of the transistor 403 has a value obtained by subtracting the electric current $I_{44}$ which flows through the resistor 413 from the electric current $I_{47}$ which flows through the constant current source 405.

The transistor 404 and the transistor 403 form a current mirror circuit, and hence between the source and the drain of the transistor 404, an electric current equivalent to an electric current which flows between the source and the drain of the transistor 403 flows. In other words, an electric current $I_{41}$ which flows between the source and the drain of the transistor 404 is equivalent to the electric current $I_{46}$. Further, being equivalent to the electric current $I_{46}$, the electric current $I_{41}$ is equivalent to a value obtained by subtracting the electric current $I_{44}$ from the electric current $I_{47}$.

An electric current which flows between the drain and the source of the depletion type n-channel transistor 402 flows to the resistor 413, and to the constant current source 407. Thus, an electric current $I_{43}$ which flows between the drain and the source of the depletion type n-channel transistor 402 becomes an electric current obtained by adding together the electric current $I_{44}$ which flows through the resistor 413 and the electric current $I_{48}$ which flows through the constant current source 407.

Here, an electric current $I_{42}$ which flows between the source and the drain of the transistor 409 takes a value obtained by subtracting, from the electric current $I_{43}$ which flows between the drain and the source of the depletion type n-channel transistor 402, the electric current $I_{41}$ which flows between the source and the drain of the transistor 404. With the electric current $I_{43}$ being an electric current obtained by adding together the electric current $I_{48}$ and the electric current $I_{44}$, and with the electric current $I_{41}$ being an electric current obtained by subtracting the electric current $I_{44}$ from the electric current $I_{47}$, the electric current $I_{42}$ takes a value which is twice the electric current $I_{44}$.

With the transistor 410 and the transistor 409 forming a current mirror circuit, an electric current equivalent to the electric current which flows between the source and the drain of the transistor 409 flows between the source and the drain of the transistor 410. In other words, an electric current $I_{45}$ which flows between the source and the drain of the transistor 410 is equivalent to the electric current $I_{42}$. In other words, the electric current $I_{45}$ takes a value which is twice the electric current $I_{44}$.

With the electric current $I_{45}$ flowing through the resistor 411, the potential of the output terminal TO takes a value obtained by multiplying a resistance value of the resistor 411 by the current value of the electric current $I_{45}$.

Thus, the potential difference between the second input terminal TN and the first input terminal TI is amplified to twice a resistance ratio of the resistor 411 with respect to the resistor 413, and is output to the output terminal TO.

(First Modification Example of Amplifier Circuit 406)

Figure 3:
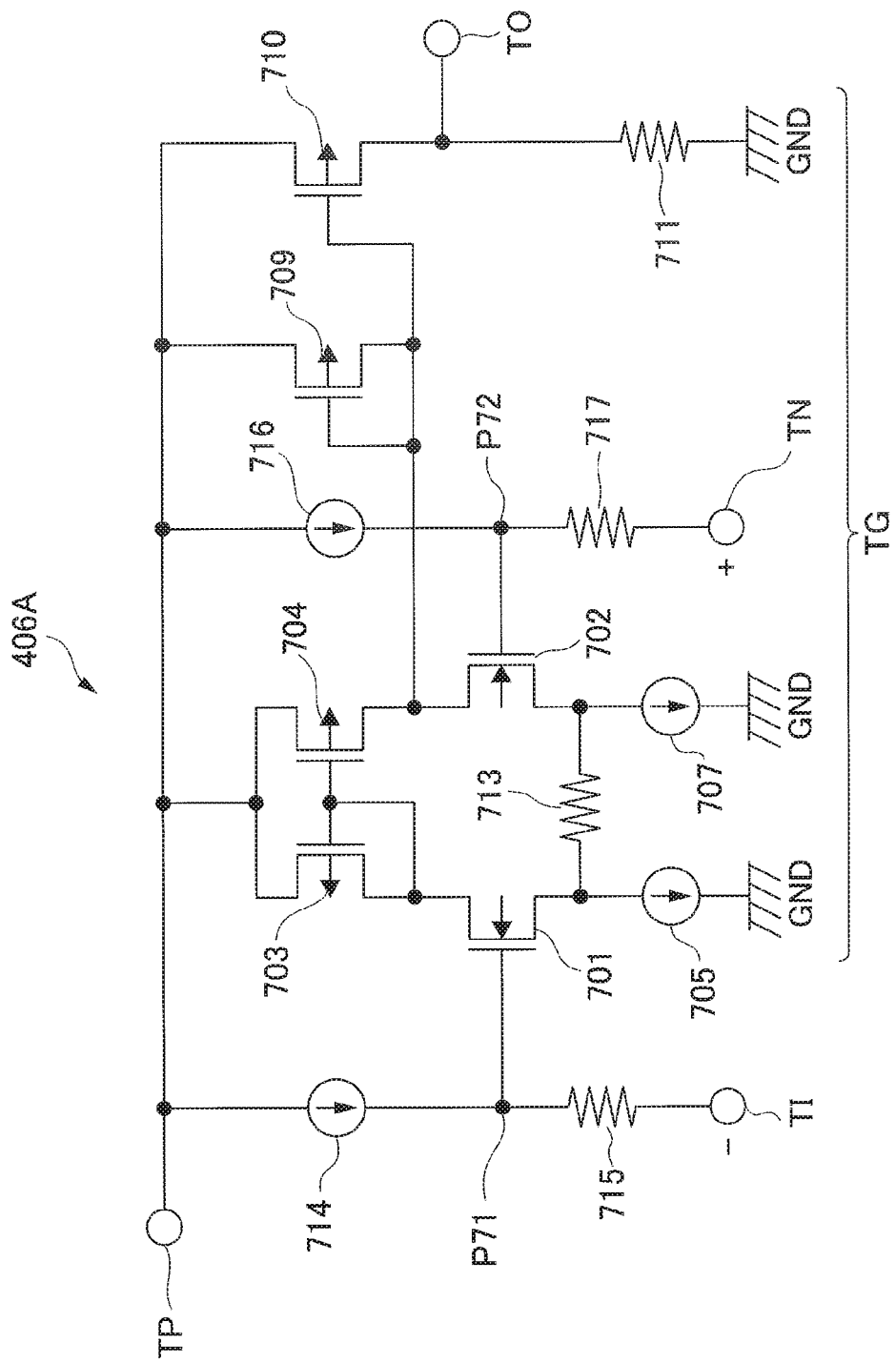
FIG. 3 is a diagram for illustrating a configuration example of a first modification of the amplifier circuit in the first embodiment.

FIG. 3 is a diagram for illustrating a configuration example of an amplifier circuit 406A which is a first modification example of the amplifier circuit 406 as the amplifier circuit in the first embodiment.

The amplifier circuit 406A includes a transistor 703, a transistor 704, a transistor 701, a transistor 702, a transistor 709, a transistor 710, a resistor 713, a resistor 711, a resistor 715, a resistor 717, a constant current source 705, a constant current source 707, a constant current source 714, and a constant current source 716.

Each of the transistor 703, the transistor 704, the transistor 709, and the transistor 710 is a p-channel transistor. Each of the transistor 701 and the transistor 702 is an n-channel transistor.

The transistor 701 has a gate connected to the first input terminal TI via the resistor 715, and to the power supply terminal TP via the constant current source 714, a source connected to the power supply terminal TG via the constant current source 705, and a drain connected to a drain of the transistor 703. The transistor 702 has a gate connected to the second input terminal TN via the resistor 717, and to the power supply terminal TP via the constant current source 716, a source connected to the power supply terminal TG via the constant current source 707, and a drain connected to a drain of the transistor 704. The source of the transistor 701 and the source of the transistor 702 are connected to each other via the resistor 713.

The transistor 703 has a source connected to the power supply terminal TP, a gate connected to the drain thereof and a gate of the transistor 704, and the drain connected to the drain of the transistor 701. The transistor 704 has a source connected to the power supply terminal TP, the gate connected to the gate of the transistor 703 and the drain of the transistor 703, and the drain connected to the drain of the transistor 702.

The transistor 709 has a gate and a drain connected to the drain of the transistor 704, and a source connected to the power supply terminal TP. The transistor 710 has a gate connected to the drain of the transistor 704, a source connected to the power supply terminal TP, and a drain connected to the output terminal TO, and to the power supply terminal TG via the resistor 711.

In the amplifier circuit 406 described above, the first input terminal TI and the second input terminal TN are connected to the gate of the transistor 401 and the gate of the transistor 402, respectively, and each of the transistor 401 and the transistor 402 is a depletion type n-channel transistor. In the amplifier circuit 406, the depletion type n-channel transistors are used because each of the first input terminal TI and the second input terminal TN of the amplifier circuit 406 has a negative potential.

In contrast, in the amplifier circuit 406A in the first modification example, the first input terminal TI is connected to the power supply via the resistor 715 and the constant current source 714. A connection point P71 between the constant current source 714 and the resistor 715 can be set to a positive potential with a current value of the constant current source 714 and a resistance value of the resistor 715. The gate of the transistor 701 is connected to the connection point P71 between the constant current source 714 and the resistor 715, and hence can be set to the positive potential. Thus, in the embodiment of the amplifier circuit 406A, it is not required to use a depletion type transistor as the transistor 701.

Likewise, the second input terminal TN is connected to the power supply via the resistor 717 and the constant current source 716. A connection point P72 between the constant current source 716 and the resistor 717 can be set to a positive potential with a current value of the constant current source 716 and a resistance value of the resistor 717. The gate of the transistor 702 is connected to the connection point P72 between the constant current source 716 and the resistor 717, and hence can be set to the positive potential. Thus, in the embodiment of the amplifier circuit 406A, it is not required to use a depletion type transistor as the transistor 702.

Second Embodiment

Figure 4:
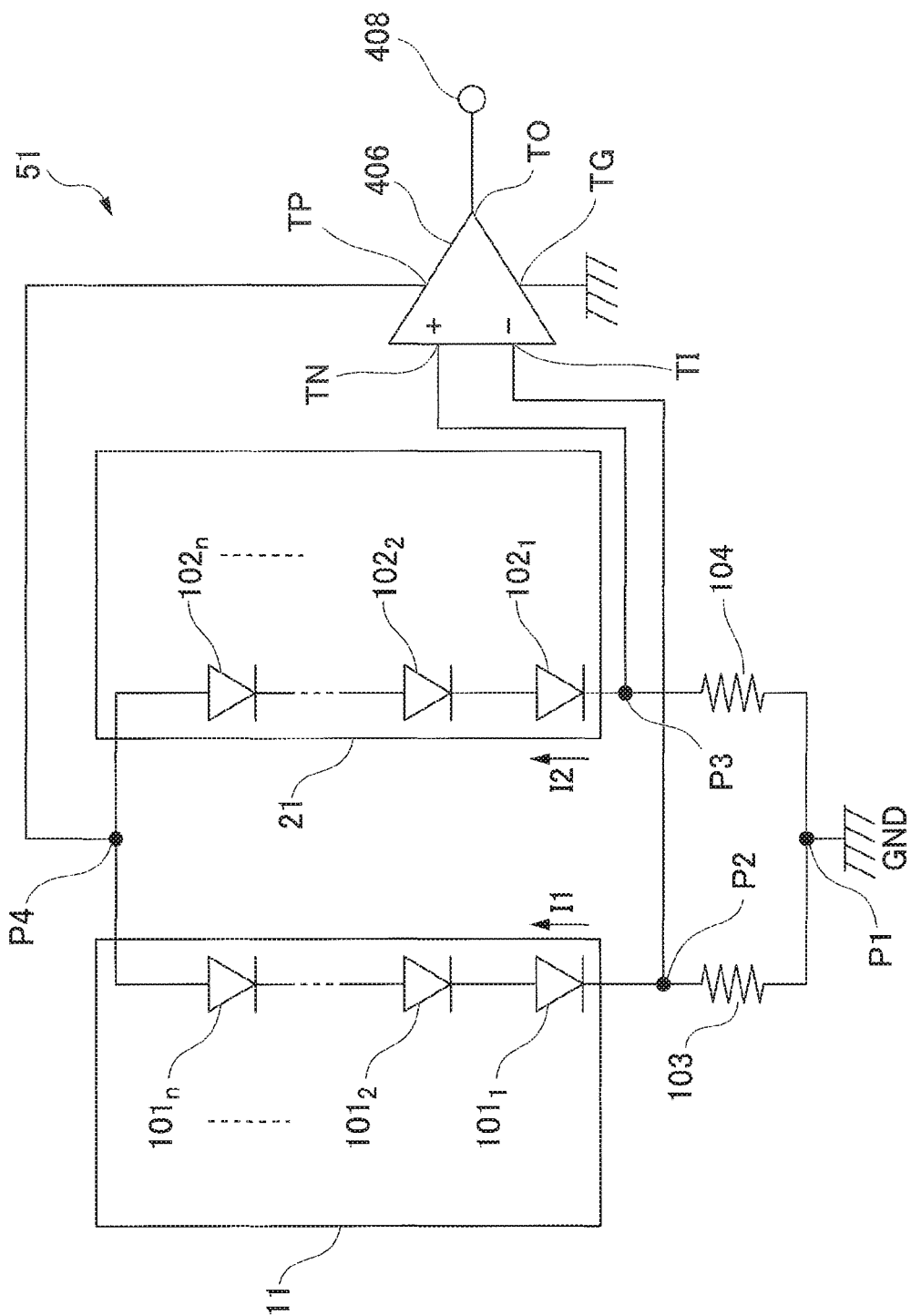
FIG. 4 is a diagram for illustrating an example of a configuration of an optical sensor according to a second embodiment of the present invention.

FIG. 4 is a diagram for illustrating an example of a configuration of an optical sensor according to a second embodiment of the present invention. Components similar to those in the first embodiment described above are denoted by the same reference symbols, and description thereof is omitted. The second embodiment is different from the first embodiment described above in that the photodetector includes a plurality of photodiodes, and in that the booster circuit 105 is not included.

The optical sensor 51 is the example of the optical sensor according to the second embodiment and includes a first photodetector 11 and a second photodetector 21.

The first photodetector 11 includes a photodiode $101_1$, a photodiode $101_2$, . . . , and a photodiode $101_n$ ($n$ is a natural number of 2 or more). The photodiodes $101_1$ to $101_n$ included in the first photodetector 11 are cascaded. In other words, the first photodetector 11 includes a plurality of cascaded photodiodes.

The second photodetector 21 includes a photodiode $102_1$, a photodiode $102_2$, . . . , and a photodiode $102_n$ ($n$ is a natural number of 2 or more). The photodiodes $102_1$ to $102_n$ included in the second photodetector 21 are cascaded. In other words, the second photodetector 21 includes a plurality of cascaded photodiodes.

The optical sensor 50 described in the first embodiment includes the booster circuit 105 to boost the voltage of the connection point P4, and uses the boosted voltage as the power supply of the amplifier circuit 406.

In contrast, in the second embodiment, each of the first photodetector 11 and the second photodetector 21 has the plurality of cascaded photodiodes. Electric power generated by the photovoltaic effect of the first photodetector 11 and the second photodetector 21 is used as the power supply of the amplifier circuit 406. Each of the first photodetector 11 and the second photodetector 21 has the plurality of cascaded photodiodes, and hence can obtain a voltage which is high enough to be usable as the power supply even with a small amount of light.

Thus, in the second embodiment, with the plurality of cascaded photodiodes being included, such the booster circuit as described above may not be included in the optical sensor of the second embodiment.

A configuration of the amplifier circuit 406 in the second embodiment is similar to the configuration of the amplifier circuit 406 in the first embodiment (which includes each modification example, of the amplifier circuit 406, such as the amplifier circuit 406A and amplifier circuits 406B and 406C described later).

Third Embodiment

Figure 5:
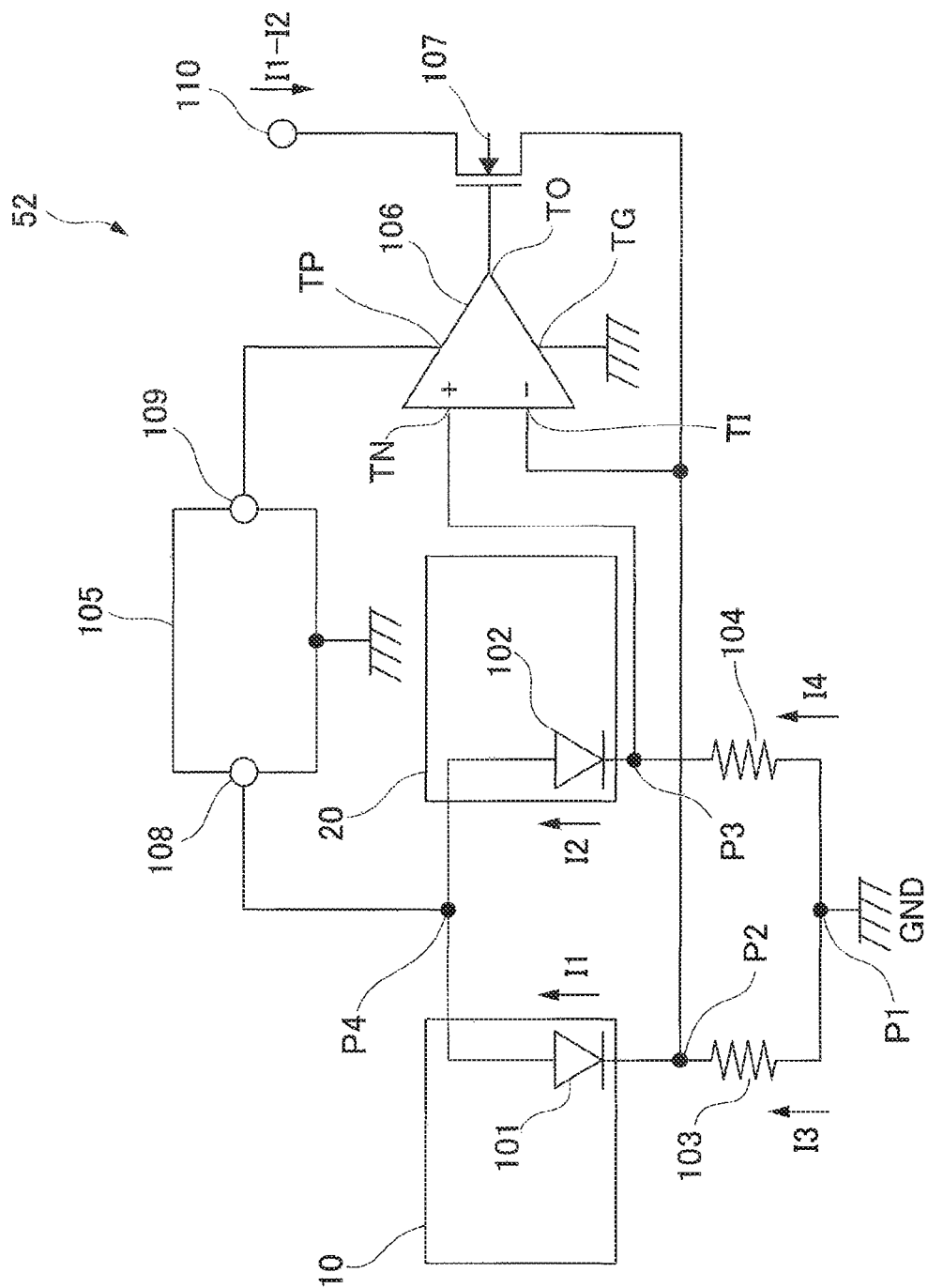
FIG. 5 is a diagram for illustrating an example of a configuration of an optical sensor according to a third embodiment of the present invention.

FIG. 5 is a diagram for illustrating an example of a configuration of an optical sensor according to a third embodiment of the present invention. Components similar to those in the first and second embodiments described above are denoted by the same reference symbols, and description thereof is omitted.

The optical sensor 52 is an example of the optical sensor according to the third embodiment, and includes a first photodetector 10, a first resistor 103, a second photodetector 20, a second resistor 104, an amplifier circuit 106, a booster circuit 105, a transistor 107, and a photodetection current output terminal 110.

The amplifier circuit 106 includes a power supply terminal TP, a power supply terminal TG, a first input terminal TI, a second input terminal TN, and an output terminal TO.

In the third embodiment, the optical sensor 52 is configured to output a difference between a current value of the photocurrent I1 generated depending on a wavelength of light detected by the first photodetector 10 and a current value of the photocurrent I2 generated depending on a wavelength of light detected by the second photodetector 20, as an amount of current taken in from the photodetection current output terminal 110. Thus, through provision of a current detection circuit (not illustrated) to the photodetection current output terminal 110, the optical sensor 52 can detect a difference between the current value of the photocurrent I1 generated in accordance with a wavelength of light detected by the first photodetector 10, and the current value of the photocurrent I2 generated in accordance with a wavelength of light detected by the second photodetector 20.

The transistor 107 is an n-channel transistor. The transistor 107 has a gate connected to the output terminal TO of the amplifier circuit 106, a source connected to the first input terminal of the amplifier circuit 106, and a drain connected to the photodetection current output terminal 110.

When light in a wavelength range which does not include light in the predetermined wavelength range enters, a magnitude of the photocurrent generated by the photovoltaic effect of the second photodetector 20 is similar to a magnitude of the photocurrent generated by the photovoltaic effect of the first photodetector 10. In the third embodiment, in the wavelength range other than the predetermined wavelength range, the potential of the first input terminal TI of the amplifier circuit 106 and the potential of the second input terminal TN of the amplifier circuit 106 are the same potential. In this case, the potential output to the output terminal TO of the amplifier circuit 106 is the same potential as the first input terminal TI and the second input terminal TN.

Thus, the amplifier circuit 106 controls a gate voltage of the transistor 107 so that no electric current flows between the drain and the source of the transistor 107. In other words, no electric current flows through the photodetection current output terminal 110.

In contrast, if light in a wavelength range including light in the predetermined wavelength range enters, the photocurrent generated by the photovoltaic effect of the second photodetector 20 is smaller than the photocurrent generated by the photovoltaic effect of the first photodetector 10. Thus, the potential of the second input terminal TN of the amplifier circuit 106 becomes larger than the potential of the first input terminal TI of the amplifier circuit 106.

In the amplifier circuit 106, with the potential of the second input terminal TN being lamer than the potential of the first input terminal TI, the potential of the output terminal TO becomes larger, and a gate potential of the transistor 107 becomes larger. As a result, an electric current flows between the drain and the source of the transistor 107. When an electric current flows between the drain and the source of the transistor 107, the potential of the first input terminal TI of the amplifier circuit 106 is increased to be the same as the potential of the second input terminal TN of the amplifier circuit 106, and becomes stable.

Here, an electric current which flows from the connection point P1 to the connection point P2 is defined as an "electric current I3", and an electric current which flows from the connection point P1 to the connection point P3 is defined as an "electric current I4".

The first resistor 103 and the second resistor 104 have the same resistance value, and hence if the potentials of the connection point P2 and the connection point P3 are the same, a magnitude of the electric current I3 which flows through the first resistor 103 and a magnitude of the electric current I4 which flows through the second resistor 104 are similar. In other words, with the electric current I3 and the electric current I4 being equal to each other, a current difference between the photocurrent I1 and the photocurrent I2 all flows from the transistor 107 to the connection point P2.

Thus, a difference between the photocurrent I1 and the photocurrent I2 flows between the drain and the source of the transistor 107. In other words, in the third embodiment, the optical sensor 52 can detect, from the photodetection current output terminal 110, a difference between light detected by the first photodetector 10 and light detected by the second photodetector 20.

The configuration of the booster circuit 105 in the third embodiment is similar to the configuration of the booster circuit 105 described in the first embodiment.

Further, also in the third embodiment, as described in the second embodiment, a photodetector may include a plurality of photodiodes, and the booster circuit 105 may not be provided.

In the third embodiment, a circuit connected to the photodetection current output terminal 110 is not limited. For example, a repeatedly chargeable battery may be connected to the photodetection current output terminal 110.

In this case, a circuit configured to perform a predetermined operation under a condition where a predetermined voltage is stored in the battery may further included. For example, wireless communication may be activated under this condition.

(Configuration Example of Amplifier Circuit 106)

Figure 6:
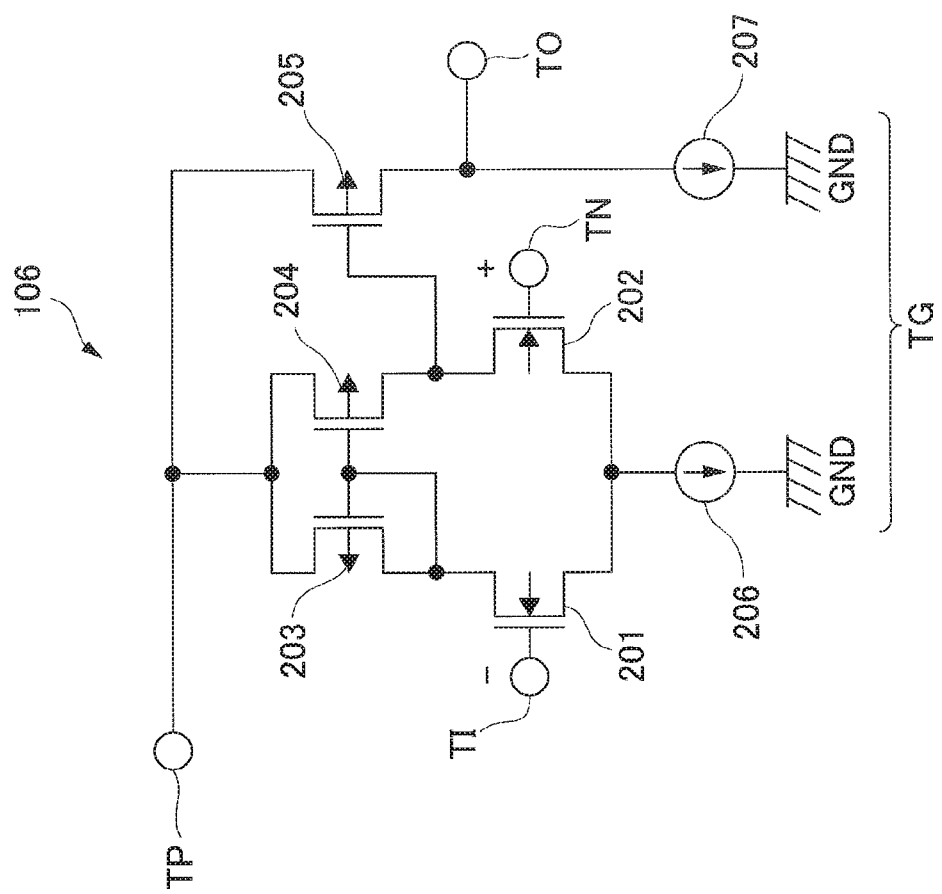
FIG. 6 is a diagram for illustrating an example of a configuration of an amplifier circuit in the third embodiment.

FIG. 6 is a diagram for illustrating an example of a configuration of the amplifier circuit in the third embodiment.

The amplifier circuit 106 is the example of the amplifier circuit included in the optical sensor 52 as the optical sensor according to the third embodiment. The amplifier circuit 106 includes a transistor 201, a transistor 202, a transistor 203, a transistor 204, a transistor 205, a constant current source 206, and a constant current source 207.

Each of the transistor 203, the transistor 204, and the transistor 205 is a p-channel transistor.

The transistor 201 is also referred to as a "first input-stage transistor". The transistor 202 is also referred to as a "second input-stage transistor". Each of the first input-stage transistor and the second input-stage transistor is a depletion type n-channel transistor.

The depletion type n-channel transistor 201 has a gate connected to the first input terminal TI of the amplifier circuit 106. The depletion type n-channel transistor 202 has a gate connected to the second input terminal TN of the amplifier circuit 106.

The depletion type n-channel transistor 201 has the gate connected to the first input terminal TI, a source connected to a source of the depletion type n-channel transistor 202, and to the power supply terminal TG via the constant current source 206, and a drain connected to a drain of the transistor 203, and to the connection point between a gate of the transistor 203 and a gate of the transistor 204. The depletion type n-channel transistor 202 has the gate connected to the second input terminal TN, the source connected to the source of the depletion type n-channel transistor 201, and to the power supply terminal TG via the constant current source 206, and a drain connected to a drain of the transistor 204, and to a gate of the transistor 205.

The transistor 203 has a source connected to the power supply terminal TP, a gate connected to the drain thereof and a gate of the transistor 204, and the drain connected to the drain of the depletion type n-channel transistor 201. The transistor 204 has a source connected to the power supply terminal TP, the gate connected to the gate of the transistor 203 and the drain of the transistor 203, and the drain connected to the drain of the depletion type n-channel transistor 202.

The transistor 205 has the gate connected to the drain of the transistor 204, a source connected to the power supply terminal TP, and a drain connected to the power supply terminal TG via the constant current source 207, and to the output terminal TO.

The transistor 203 and the transistor 204 form a current mirror circuit. Between the source and the drain of the transistor 204, an electric current corresponding to an electric current which flows between the source and the drain of the transistor 203 flows.

When a gate potential of the depletion type n-channel transistor 201 and a gate potential of the depletion type n-channel transistor 202 are the same, similar electric currents flow between the drain and the source of the depletion type n-channel transistor 201 and between the drain and the source of the depletion type n-channel transistor 202. Between the source and the drain of the transistor 205, an electric current corresponding to a potential difference between the gate and the source of the transistor 205 flows.

When the gate potential of the depletion type n-channel transistor 202 is increased, an electric current which flows between the drain and the source of the depletion type n-channel transistor 202 is increased. The electric current which flows between the drain and the source of the depletion type n-channel transistor 202 flows to the power supply terminal TG via the constant current source 206. The electric current flowed to the power supply terminal TG via the constant current source 206 is limited by the constant current source 206. Thus, if the gate potential of the depletion type n-channel transistor 202 is increased, a potential of the drain of the depletion type n-channel transistor 202 is reduced.

As the potential difference between the gate and the source of the transistor 205 becomes larger, an electric current which flows between the source and the drain of the transistor 205 becomes larger. The electric current which flows between the source and the drain of the transistor 205 flows to the power supply terminal TG via the constant current source 207. The electric current flowed to the power supply terminal TG via the constant current source 207 is limited by the constant current source 207, and hence an output potential of the output terminal TO is increased.

Thus, when the gate potential of the depletion type n-channel transistor 202 is increased, the output potential of the output terminal TO is increased.

Returning to FIG. 5, if an output potential of the amplifier circuit 106 is increased, at the photodetection current output terminal 110, an electric current as the difference between the photocurrent I1 and the photocurrent I2 is generated.

(First Modification Example of Amplifier Circuit 106)

Figure 7:
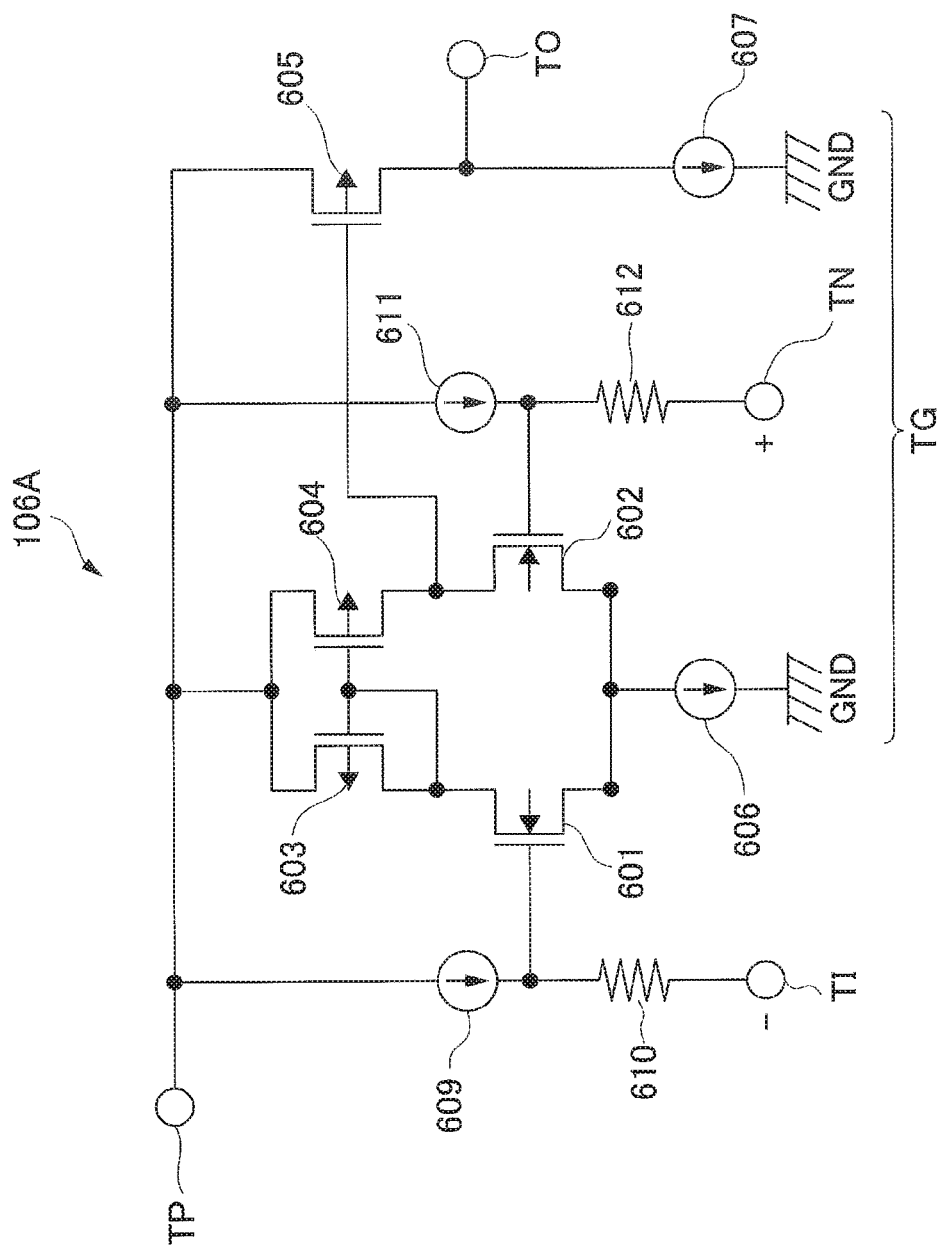
FIG. 7 is a diagram for illustrating a configuration example of a first modification of the amplifier circuit in the third embodiment.

FIG. 7 is a diagram for illustrating a configuration example of a first modification of the amplifier circuit in the third embodiment. The amplifier circuit 106A is the first modification example of the amplifier circuit 106 as the amplifier circuit in the third embodiment. Components similar to those in the embodiments described above are denoted by the same reference symbols, and description thereof is omitted.

The amplifier circuit 106A includes a transistor 601, a transistor 602, a transistor 603, a transistor 604, a transistor 605, a constant current source 606, a constant current source 607, a constant current source 609, a resistor 610, a constant current source 611, and a resistor 612.

Each of the transistor 601 and the transistor 602 is an n-channel transistor.

Each of the transistor 603, the transistor 604, and the transistor 605 is a p-channel transistor.

The transistor 601 has a gate connected to the first input terminal TI via the resistor 610, and to the power supply terminal TP via the constant current source 609, a source connected to the power supply terminal TG via the constant current source 606, and a drain connected to a drain of the transistor 603. The transistor 602 has a gate connected to the second input terminal TN via the resistor 612, and to the power supply terminal TP via the constant current source 611, a source connected to the power supply terminal TG via the constant current source 606, and a drain connected to a drain of the transistor 604 and to a gate of the transistor 605.

The transistor 603 has a source connected to the power supply terminal TP, a gate connected to the drain thereof and a gate of the transistor 604, and the drain connected to the drain of the transistor 601. The transistor 604 has a source connected to the power supply terminal TP, the gate connected to the gate of the transistor 603 and the drain of the transistor 603, and the drain connected to the drain of the transistor 602.

The transistor 605 has a gate connected to the drain of the transistor 604 and the drain of the transistor 602, a source connected to the power supply terminal TP, and a drain connected to the output terminal TO, and to the power supply terminal TG via the constant current source 607.

In the embodiment of the amplifier circuit 106 described above, the first input terminal TI and the second input terminal TN are connected to the gate of the transistor 201 and the gate of the transistor 202, respectively, and each of the transistor 201 and the transistor 202 is a depletion type n-channel transistor. In the embodiment of the amplifier circuit 106, the depletion type n-channel transistors are used because each of the first input terminal TI and the second input terminal TN of the amplifier circuit 106 has a negative potential.

In contrast, in the amplifier circuit 106A in this embodiment, the first input terminal TI is connected to the power supply via the resistor 610 and the constant current source 609. A connection point between the constant current source 609 and the resistor 610 can be set to a positive potential with a current value of the constant current source 609 and a resistance value of the resistor 610. The gate of the transistor 601 is connected to the connection point between the constant current source 609 and the resistor 610, and hence can be set to the positive potential. Thus, in the embodiment of the amplifier circuit 106A, it is not required to use a depletion type transistor as the transistor 601.

Likewise, the second input terminal TN is connected to the power supply via the resistor 612 and the constant current source 611. A connection point between the constant current source 611 and the resistor 612 can be set to a positive potential with a current value of the constant current source 611 and a resistance value of the resistor 612. The gate of the transistor 602 is connected to the connection point between the constant current source 611 and the resistor 612, and hence can be set to the positive potential. Thus, in the embodiment of the amplifier circuit 106A, it is not required to use a depletion type transistor as the transistor 602.

(Second Modification Example of Amplifier Circuit 106)

Figure 8:
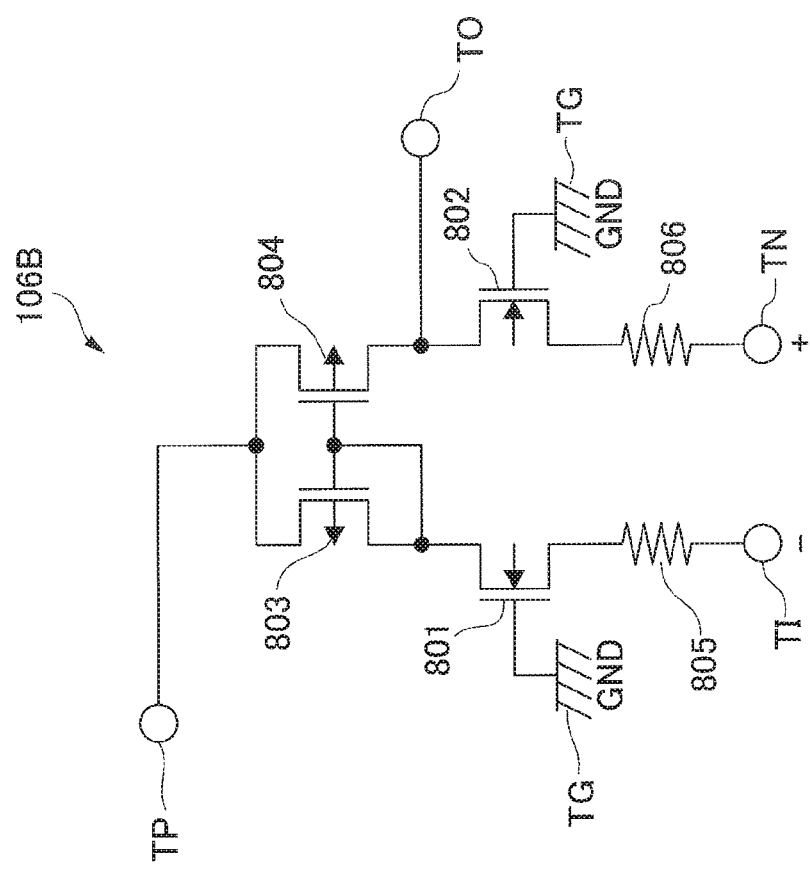
FIG. 8 is a diagram for illustrating a configuration example of a second modification of the amplifier circuit in the third embodiment.

FIG. 8 is a diagram for illustrating a configuration example of an amplifier circuit 106B which is a second modification example of the amplifier circuit 106 as the amplifier circuit in the third embodiment. Components similar to those in the embodiments described above are denoted by the same reference symbols, and description thereof is omitted.

The amplifier circuit 106B includes a transistor 801, a transistor 802, a transistor 803, a transistor 804, a resistor 805, and a resistor 806.

Each of the transistor 803 and the transistor 804 is a p-channel transistor. The transistor 801 is also referred to as a "third input-stage transistor". The transistor 802 is also referred to as a "fourth input-stage transistor". Each of the transistor 801 and the transistor 802 is a depletion type n-channel transistor.

A resistance value of the resistor 805 and a resistance value of the resistor 806 are equal to each other.

The depletion type n-channel transistor 801 has a gate connected to the power supply terminal TG, a source connected to the first input terminal TI via the resistor 805, and a drain connected to a drain of the transistor 803, and to the connection point between a gate of the transistor 803 and a gate of the transistor 804. In other words, to the source of the depletion type n-channel transistor 801, the first input terminal TI of the amplifier circuit 106B is connected via the resistor 805.

The depletion type n-channel transistor 802 has a gate connected to the power supply terminal TG, a source connected to the second input terminal TN via the resistor 806, and a drain connected to a drain of the transistor 804, and to the output terminal TO. In other words, to the source of the depletion type n-channel transistor 802, the second input terminal TN of the amplifier circuit 106B is connected via the resistor 806.

The transistor 803 has a source connected to the power supply terminal TP, a gate connected to the drain thereof and a gate of the transistor 804, and the drain connected to the drain of the depletion type n-channel transistor 801. The transistor 804 has a source connected to the power supply terminal TP, the gate connected to the gate of the transistor 803 and the drain of the transistor 803, and the drain connected to the drain of the depletion type n-channel transistor 802 and to the output terminal TO.

The transistor 803 and the transistor 804 form a current mirror circuit. Between the source and the drain of the transistor 804, an electric current corresponding to an electric current which flows between the source and the drain of the transistor 803 flows.

Here, in the optical sensor 52 formed of the amplifier circuit 106B, the first input terminal TI of the amplifier circuit 106B is connected to the connection point P2. When the first photodetector 10 detects light, the photocurrent I1 flows from the connection point P1 having a ground potential to the first photodetector 10 via the first resistor 103. Thus, the potential of the connection point P2 takes a value which is lower than the ground potential. For example, when the ground potential is 0 volts (V), the potential of the connection point P2 becomes a negative potential.

With the gate of the depletion type n-channel transistor 801 being connected to a ground point, a potential difference is generated between the gate and the source of the depletion type n-channel transistor 801, and an electric current similar to that between the source and the drain of the transistor 803 flows between the drain and the source of the depletion type n-channel transistor 801. In other words, in the third embodiment, the first input terminal TI outputs an electric current.

The second input terminal TN is connected to the connection point P3. When the second photodetector 20 detects light, the photocurrent I2 flows from the connection point P1 having a ground potential to the second photodetector 20 via the second resistor 104. Thus, the potential of the connection point P3 takes a value which is lower than the ground potential. For example, when the ground potential is 0 volts (V), the potential of the connection point P3 becomes a negative potential.

With the gate of the depletion type n-channel transistor 802 being connected to the ground point, a potential difference is generated between the gate and the source of the depletion type n-channel transistor 802, and an electric current similar to that between the drain and the source of the depletion type n-channel transistor 802 flows between the drain and the source of the depletion type n-channel transistor 802. In other words, in the third embodiment, the output terminal TO outputs an electric current.

The potential of the output terminal TO is controlled so that a source potential of the depletion type n-channel transistor 802 becomes equal to a source potential of the depletion type n-channel transistor 801. The resistor 805 and the resistor 806 are equal to each other, and hence the first input terminal TI and the second input terminal TN have equal potentials.

When the first photodetector 10 and the second photodetector 20 detect light in the predetermined wavelength range, the potential of the connection point P3 becomes higher than the potential of the connection point P2 in proportion to the light intensity. The output potential of the output terminal TO is controlled so that the potential of the first input terminal TI and the potential of the second input terminal TN become equal to each other.

Returning to FIG. 5, there is a case where the potential of the output terminal TO of the amplifier circuit 106 is increased. In this case, an electric current flows from the photodetection current output terminal 110 via the drain and the source of the transistor 107. The electric current which flows between the drain and the source of the transistor 107 flows through the first photodiode 101.

Thus, a difference between the photocurrent I1 and the photocurrent I2 flows between the drain and the source of the transistor 107. In other words, in the third embodiment, the optical sensor 52 can detect, from the photodetection current output terminal 110, a difference between light detected by the first photodetector 10 and light detected by the second photodetector 20.

(Second Modification Example of Amplifier Circuit 406)

Figure 9:
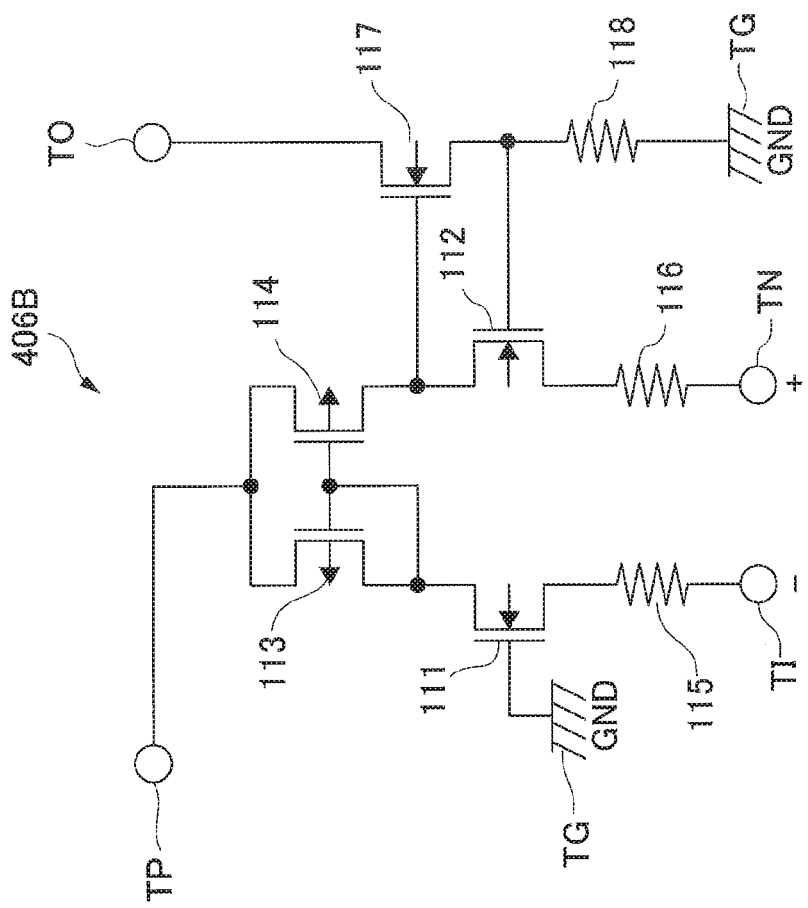
FIG. 9 is a diagram for illustrating a configuration example of a second modification of the amplifier circuit in the first embodiment.

FIG. 9 is a diagram for illustrating a configuration example of a second modification of the amplifier circuit 406 as the amplifier circuit in the first embodiment. An amplifier circuit 406B is the second modification example of the amplifier circuit 406. Components similar to those in the embodiments described above are denoted by the same reference symbols, and description thereof is omitted.

The amplifier circuit 406B includes a transistor 111, a transistor 112, a transistor 113, a transistor 114, a transistor 117, a resistor 115, a resistor 116, and a resistor 118.

Each of the transistor 113, the transistor 114, and the transistor 117 is a p-channel transistor. Each of the transistor 111 and the transistor 112 is a depletion type n-channel transistor.

A resistance value of the resistor 115 and a resistance value of the resistor 116 are equal to each other.

The depletion type n-channel transistor 111 has a gate connected to the power supply terminal TG, a source connected to the first input terminal TI via the resistor 115, and a drain connected to a drain of the transistor 113, and to the connection point between a gate of the transistor 113 and a gate of the transistor 114.

The depletion type n-channel transistor 112 has a gate connected to the connection point between the transistor 117 and the resistor 118, a source connected to the second input terminal TN via the resistor 116, and a drain connected to a drain of the transistor 114, and to a gate of the transistor 117.

The transistor 113 has a source connected to the power supply terminal TP, a gate connected to the drain thereof and a gate of the transistor 114, and the drain connected to the drain of the depletion type n-channel transistor 111. The transistor 114 has a source connected to the power supply terminal TP, the gate connected to the gate of the transistor 113 and the drain of the transistor 113, and the drain connected to the drain of the depletion type n-channel transistor 112 and to the gate of the transistor 117.

The transistor 117 has a drain connected to the output terminal TO, the gate connected to the connection point between the drain of the transistor 114 and the depletion type n-channel transistor 112, and a source connected to the connection point between the gate of the depletion type n-channel transistor 112 and the resistor 118.

In the embodiment of the amplifier circuit 106B described above, the output potential of the output terminal TO is controlled so that the potential of the first input terminal TI and the potential of the second input terminal TN become equal to each other. In other words, the output potential of the output terminal TO is controlled by the difference between the light detected by the first photodetector 10 and the light detected by the second photodetector 20.

In contrast, in the first embodiment, an electric current entering from the output terminal TO is controlled so that an electric current which flows through the first input terminal TI and an electric current which flows through the second input terminal TN become equal to each other. In other words, the electric current which flows into the output terminal TO is controlled with the difference between the light detected by the first photodetector 10 and the light detected by the second photodetector 20.

In this embodiment, the depletion type n-channel transistor 112 has the gate connected to the source of the transistor 117, and to the connection point between the depletion type n-channel transistor 112 and the resistor 118. Thus, a source voltage of the transistor 117 is controlled so that a current value of an electric current which flows through the resistor 115 and a current value of an electric current which flows through the resistor 116 become equal to each other.

Specifically, a source voltage of the depletion type n-channel transistor 112 becomes higher than a source voltage of the depletion type n-channel transistor 111 by the potential difference between the first input terminal TI and the second input terminal TN. The depletion type n-channel transistor 111 has the gate connected to the power supply terminal TG, and hence a gate voltage of the depletion type n-channel transistor 112 becomes higher than a potential of the power supply terminal TG by the potential difference between the first input terminal TI and the second input terminal TN.

To the resistor 118, a potential which is equal to the potential difference between the first input terminal TI and the second input terminal TN is applied, and from the output terminal TO, an electric current of a value obtained by dividing the potential difference between the first input terminal TI and the second input terminal TN by a resistance value of the resistor 118 flows. In other words, an electric current in proportion to the potential difference between the input terminals flows from the output terminal TO.

Thus, the amplifier circuit 406B can detect, based on the value of the electric current which flows in the output terminal TO, the difference between the light detected by the first photodetector 10 and the light detected by the second photodetector 20.

(Third Modification Example of Amplifier Circuit 406)

Figure 10:
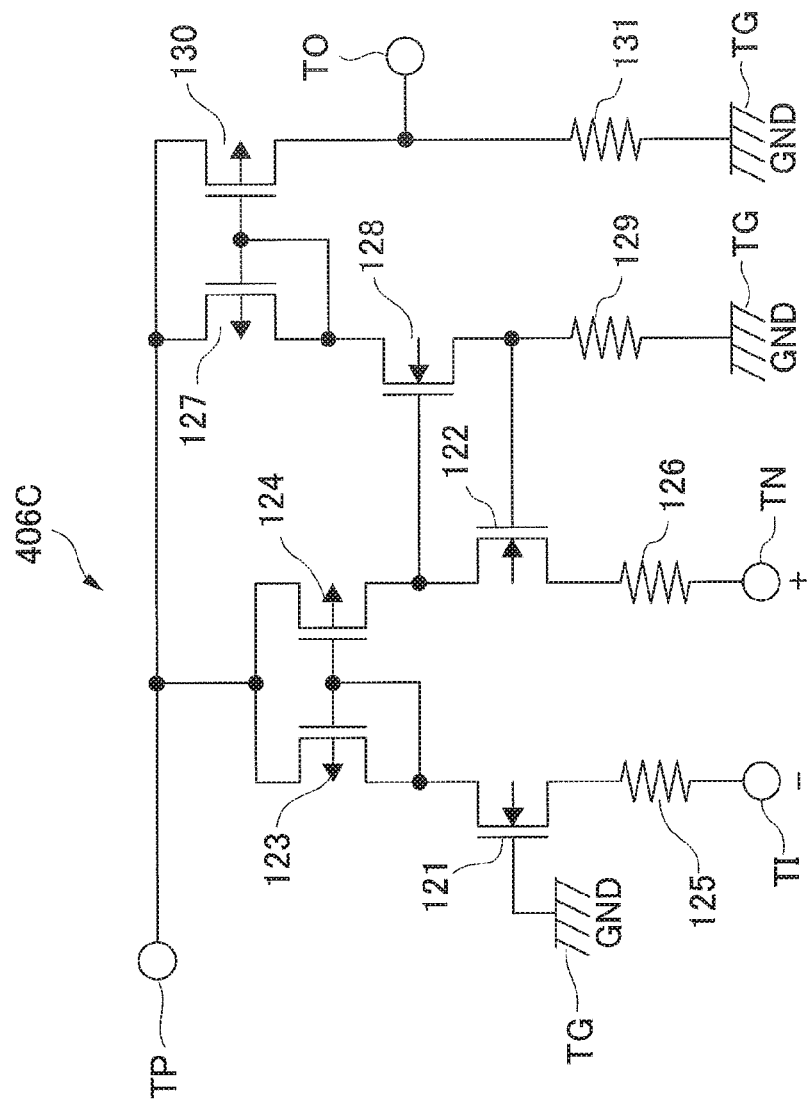
FIG. 10 is a diagram for illustrating a configuration example of a third modification of the amplifier circuit in the first embodiment.

FIG. 10 is a diagram for illustrating a configuration example of a third modification of the amplifier circuit in the first embodiment. An amplifier circuit 406C is the third modification example of the amplifier circuit 406. Components similar to those in the embodiments described above are denoted by the same reference symbols, and description thereof is omitted.

The amplifier circuit 406C includes a transistor 121, a transistor 122, a transistor 123, a transistor 124, a transistor 127, a transistor 128, a transistor 130, a resistor 125, a resistor 126, a resistor 129, and a resistor 131.

Each of the transistor 123, the transistor 124, the transistor 127, the transistor 128, and the transistor 130 is a p-channel transistor. Each of the transistor 121 and the transistor 122 is a depletion type n-channel transistor.

A resistance value of the resistor 125 and a resistance value of the resistor 126 are equal to each other.

The depletion type n-channel transistor 121 has a gate connected to the power supply terminal TG, a source connected to the first input terminal TI via the resistor 125, and a drain connected to a drain of the transistor 123, and to the connection point between a gate of the transistor 123 and a gate of the transistor 124.

The depletion type n-channel transistor 122 has a gate connected to the connection point between a source of the transistor 128 and the resistor 129, a source connected to the second input terminal TN via the resistor 126, and a drain connected to a connection point between a drain of the transistor 124 and a gate of the transistor 128.

The transistor 123 has a source connected to the power supply terminal TP, a gate connected to the drain thereof and a gate of the transistor 124, and the drain connected to the drain of the depletion type n-channel transistor 121. The transistor 124 has a source connected to the power supply terminal TP, the gate connected to the gate of the transistor 123 and the drain of the transistor 123, and the drain connected to the drain of the depletion type n-channel transistor 122 and to the gate of the transistor 128.

The transistor 127 has a source connected to the power supply terminal TP, a gate connected to the connection point between a gate of the transistor 130 and the drain of the transistor 127, and a drain connected to the connection point between a drain of the transistor 128 and the gate of the transistor 127.

The transistor 128 has the drain connected to the connection point between the drain of the transistor 127 and the gate of the transistor 127, a gate connected to the connection point between the drain of the transistor 124 and the drain of the depletion type n-channel transistor 122, and a source connected to the connection point between the gate of the depletion type n-channel transistor 122 and the resistor 129.

The transistor 130 has a source connected to the power supply terminal TP, the gate connected to the connection point between the gate of the transistor 127 and the drain of the transistor 127, and a drain connected to the connection point between the output terminal TO and the resistor 131.

In the first embodiment of the amplifier circuit 406B described above, an electric current entering from the output terminal TO is controlled so that an electric current which flows through the first input terminal TI and an electric current which flows through the second input terminal TN become equal to each other. In other words, the electric current which flows into the output terminal TO is controlled with the difference between the light detected by the first photodetector 10 and the light detected by the second photodetector 20.

In contrast, in the first embodiment, an electric current which has flowed through the output terminal TO of the amplifier circuit 406B described above is copied by a current mirror circuit formed of the transistor 127 and the transistor 130. The copied electric current outputs a voltage corresponding to a resistance value of the resistor 131. In other words, to the output terminal TO, a voltage based on a resistance ratio of the resistor 131 with respect to the resistor 129 is output.

In the first embodiment, the depletion type n-channel transistor 122 has the gate connected to the source of the transistor 128, and to the connection point between the depletion type n-channel transistor 122 and the resistor 129. Thus, a source voltage of the transistor 128 is controlled so that a current value of an electric current which flows through the resistor 125 and a current value of an electric current which flows through the resistor 126 become equal to each other.

Specifically, a source voltage of the depletion type n-channel transistor 122 becomes higher than a source voltage of the depletion type n-channel transistor 121 by the potential difference between the first input terminal TI and the second input terminal TN. The depletion type n-channel transistor 121 has the gate connected to the power supply terminal TG, and hence a gate voltage of the depletion type n-channel transistor 122 becomes higher than a potential of the power supply terminal TG by the potential difference between the first input terminal TI and the second input terminal TN.

To the resistor 129, a potential which is equal to the potential difference between the first input terminal TI and the second input terminal TN is applied, and an electric current of a value obtained by dividing the potential difference between the first input terminal TI and the second input terminal TN by a resistance value of the resistor 129 flows.

Here, the transistor 127 and the transistor 130 form the current mirror circuit. An electric current which flows through the resistor 129 is equal to an electric current which flows through the transistor 127, and hence an electric current which is equal to the electric current which flows through the resistor 129 flows through the transistor 130. In other words, an electric current of a value obtained by dividing the potential difference between the first input terminal TI and the second input terminal TN by a resistance value of the resistor 129 flows through the transistor 130.

In other words, from the output terminal TO, a voltage obtained by multiplying the potential difference between the first input terminal TI and the second input terminal TN by the resistance ratio of the resistor 131 with respect to the resistor 129 is output from the output terminal.

Thus, a voltage corresponding to the intensity in the predetermined wavelength range is output from the output terminal TO.

According to the embodiments described above, the optical sensor 50 includes the first photodetector 10 having the first wavelength sensitivity characteristic and the second photodetector 20 having the second wavelength sensitivity characteristic. The first wavelength sensitivity characteristic is a characteristic of generating electric power with respect to light in a wide range of wavelengths, and the second wavelength sensitivity characteristic which has a reduced sensitivity only for light in the predetermined wavelength range with respect to the first wavelength sensitivity characteristic.

The optical sensor 50 can detect light in the predetermined wavelength range by comparing an electric current generated by the photovoltaic effect of the first photodetector 10 and an electric current generated by the photovoltaic effect of the second photodetector 20.

Further, the optical sensor 50 uses, as the power supply of the amplifier circuit 106, the electric power generated by the first photodetector 10 and the second photodetector 20.

In the conventional optical sensor, an external power supply is required in a drive circuit, while the optical sensor according to the embodiments described above can drive even if there is no external power supply.

That is, the optical sensor according to the embodiments without an external power supply can be configured.

Further, according to the embodiments described above, the optical sensor 50 includes the booster circuit 105. The booster circuit 105 boosts the electric power generated by the first photodetector 10 and the second photodetector 20. The booster circuit 105 supplies the boosted electric power to the power supply terminal of the amplifier circuit 106.

Here, a drive voltage of the amplifier circuit 106 may be larger than a voltage generated by the first photodetector 10 and the second photodetector 20. In this case, the booster circuit 105 boosts the voltage to a voltage which is equal to or higher than the drive voltage of the amplifier circuit 106.

Thus, with the booster circuit 105, the optical sensor 50 can drive the amplifier circuit 106 even if the voltage generated by the first photodetector 10 and the second photodetector 20 is lower than an operating voltage of the amplifier circuit 106.

Further, according to the embodiments described above, the first photodetector 10 includes the plurality of cascaded photodiodes, and the second photodetector 20 includes the plurality of cascaded photodiodes.

A booster circuit in the related art requires a clock generation circuit, a charge pump circuit, and other circuits. However, through adoption of the configuration according to the embodiments described above in which the plurality of photodiodes are cascaded, the first photodetector 10 and the second photodetector 20 can obtain a voltage which is sufficient to drive the amplifier circuit 106.

Thus, the optical sensor 50 does not require the clock generation circuit, the charge pump circuit, and other circuits used in the booster circuit.

Consequently, as compared to the circuit configuration including the clock generation circuit, the charge pump circuit, and other circuits in the related art, the optical sensor 50 has a simplified circuit configuration. As a result, circuit arrangement and other circuit design operations are facilitated.

Further, according to the embodiments described above, the optical sensor 50 includes the n-channel transistor 107 and the photodetection current output terminal 110.

The optical sensor 50 can simplify the configuration of the amplifier circuit 106 by including the n-channel transistor 107 and the photodetection current output terminal 110.

Thus, the optical sensor 50 can reduce the cost by simplifying the circuit configuration. Further, with the simplified configuration of the amplifier circuit 106, the optical sensor 50 has a simplified circuit configuration to facilitate the circuit arrangement and other circuit design operations.

Further, according to the embodiments described above, as the input terminal of the amplifier circuit 106, a depletion type n-channel transistor is used. With this configuration, the amplifier circuit 106 can detect a negative potential without adding an element configured to set the gate of the transistor to a positive potential.

Thus, the circuit configuration of the optical sensor 50 is simplified. With the simplified configuration of the optical sensor 50, the circuit arrangement and other circuit design operations are facilitated.

Further, according to the embodiments described above, the input terminal of the amplifier circuit 106 is connected to the source of the depletion type n-channel transistor via the resistor. With this configuration, the amplifier circuit 106 can suppress power consumption.

Hereinabove, the embodiments of the present invention have been described in detail with reference to the drawings. However, specific structures of the present invention are not limited to those embodiments and encompass designs and the like without departing from the gist of the present invention. These embodiments and modifications of the present invention are encompassed in the inventions defined in claims and equivalents thereof as well as in the scope and the gist of the invention.

What is claimed is:

1. An optical sensor, comprising:
a first photodetector which includes a photodiode and has a first wavelength sensitivity characteristic;
a first resistor having a first end connected to a cathode of the photodiode of the first photodetector, and a second end connected to a ground point;
a second photodetector which includes a photodiode having an anode connected to an anode of the photodiode of the first photodetector, and has a second wavelength sensitivity characteristic being different from the first wavelength sensitivity characteristic;
a second resistor having a first end connected to a cathode of the photodiode of the second photodetector, and a second end connected to the ground point; and
an amplifier circuit having a power supply terminal, a first input terminal connected to the cathode of the photodiode of the first photodetector, a second input terminal connected to the cathode of the photodiode of the second photodetector, and an output terminal configured to output a potential based on a difference between a potential of the first input terminal and a potential of the second input terminal, the amplifier circuit being configured to use, as an operating power supply, electric power generated by electromotive force of the photodiode of the first photodetector and the photodiode of the second photodetector.

2. The optical sensor according to claim 1, further comprising a booster circuit configured to supply electric power obtained by boosting the electric power generated by the electromotive force to the power supply terminal of the amplifier circuit.

3. The optical sensor according to claim 1,
wherein the first photodetector includes a plurality of cascaded photodiodes, and
wherein the second photodetector includes a plurality of cascaded photodiodes.

4. The optical sensor according to claim 1, further comprising:
an n-channel transistor; and
a photodetection current output terminal,
wherein the n-channel transistor has a gate connected to the output terminal of the amplifier circuit, a source connected to the first input terminal of the amplifier circuit, and a drain connected to the photodetection current output terminal.

5. The optical sensor according to claim 1, further comprising:
a first input-stage transistor; and
a second input-stage transistor,
wherein the first input-stage transistor is a depletion type n-channel transistor, and has a gate connected to the first input terminal of the amplifier circuit,
wherein the second input-stage transistor is a depletion type n-channel transistor, and has a gate connected to the second input terminal of the amplifier circuit.

6. The optical sensor according to claim 1, further comprising:
a first input-stage transistor; and
a second input-stage transistor,
wherein the first input-stage transistor has a source connected to the first input terminal of the amplifier circuit via a resistor,
wherein the second input-stage transistor has a source connected to the second input terminal of the amplifier circuit via a resistor, and
wherein each of the first input-stage transistor and the second input-stage transistor is a depletion type n-channel transistor.

* * * * *